United States Patent
Karpovsky et al.

(10) Patent No.: US 11,074,337 B2
(45) Date of Patent: Jul. 27, 2021

(54) INCREASING SECURITY OF A PASSWORD-PROTECTED RESOURCE BASED ON PUBLICLY AVAILABLE DATA

(71) Applicant: Microsoft Technology Licensing, LLC, Redmond, WA (US)

(72) Inventors: Andrey Karpovsky, Kiryat Motzkin (IL); Yotam Livny, Gadera (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 252 days.

(21) Appl. No.: 16/051,112

(22) Filed: Jul. 31, 2018

(65) Prior Publication Data
US 2020/0042694 A1 Feb. 6, 2020

(51) Int. Cl.
| | |
|---|---|
| *G06F 21/00* | (2013.01) |
| *G06F 21/46* | (2013.01) |
| *G06N 20/00* | (2019.01) |
| *G06F 40/20* | (2020.01) |

(52) U.S. Cl.
CPC .............. *G06F 21/46* (2013.01); *G06F 40/20* (2020.01); *G06N 20/00* (2019.01)

(58) Field of Classification Search
CPC .......... G06F 21/46; G06F 40/20; G06N 20/00
See application file for complete search history.

(56) References Cited

U.S. PATENT DOCUMENTS

| | | | |
|---|---|---|---|
| 8,769,607 B1 * | 7/2014 | Jerdonek | G06F 21/31 726/1 |
| 9,396,324 B1 * | 7/2016 | Gariepy | H04L 63/0846 |
| 9,524,393 B2 * | 12/2016 | Aggarwal | G06F 21/604 |

(Continued)

FOREIGN PATENT DOCUMENTS

WO  WO-2011042248 A1 *  4/2011  ............. G06F 21/46

OTHER PUBLICATIONS (Theodosis Mourouzis, et al., The Evolution of User-Selected Passwords: A Quantitative Analysis of Publicly Available Datasets, arxiv.org, Cornell University Library, 201 Olin Library Cornell University Ithaca, NY 14853, Apr. 11, 2018, hereinafter Mourouzis).*

(Continued)

*Primary Examiner* — Jeffery L Williams
(74) *Attorney, Agent, or Firm* — Wade IP Law PLLC

(57) ABSTRACT

Techniques are described herein that are capable of increasing security of a password-protected resource based on publicly available data. For instance, password generation models may be extracted from passwords (e.g., encrypted versions of the passwords) that are generated by users. A user password (e.g., encrypted version of the user password) may be received to be utilized to access a designated password-protected resource from a user of a computing device. Publicly available data regarding the user may be obtained. The password generation models may be applied using the publicly available data to generate sample passwords. The sample passwords may be compared to the user password to determine that the user password and each of one or more of the sample passwords include at least one common element. An alternative password may be recommended for use by the user in lieu of the user password.

20 Claims, 7 Drawing Sheets

(56) References Cited

U.S. PATENT DOCUMENTS

| | | | | |
|---|---|---|---|---|
| 9,843,574 | B1* | 12/2017 | Triandopoulos | H04L 63/083 |
| 2008/0016347 | A1* | 1/2008 | Maj | G06F 21/34 |
| | | | | 713/168 |
| 2012/0167225 | A1* | 6/2012 | Gomez | G06Q 50/01 |
| | | | | 726/26 |
| 2014/0068731 | A1* | 3/2014 | Belisario | G06F 21/46 |
| | | | | 726/6 |
| 2015/0254452 | A1* | 9/2015 | Kohlenberg | H04L 63/06 |
| | | | | 726/6 |
| 2015/0295913 | A1* | 10/2015 | Foote | H04L 63/083 |
| | | | | 726/6 |
| 2017/0289168 | A1* | 10/2017 | Bar | H04L 63/102 |
| 2018/0012014 | A1* | 1/2018 | Sahin | G06F 21/00 |
| 2018/0060564 | A1* | 3/2018 | Shapiro | G06F 21/46 |
| 2018/0332023 | A1* | 11/2018 | Chari | H04L 63/20 |
| 2020/0134169 | A1* | 4/2020 | Sunkavally | G06F 21/46 |

OTHER PUBLICATIONS

Phuong Cao, Hongyang Li, Personalized Password Guessing: a New Security Threat, https://dl.acm.org/doi/pdf/10.1145/2600176.2600198, Apr. 8-9, 2014, pp. 1-2.*

Mourouzis, et al., "The Evolution of User-Selected Passwords: A Quantitative Analysis of Publicly Available Datasets", In repository of arxiv, arXiv:1804.03946, Apr. 11, 2018, 23 Pages.

"International Search Report and Written Opinion Issued in PCT Application No. PCTUS2019039642", dated Sep. 17, 2019, 14 Pages.

* cited by examiner

INCREASING SECURITY OF A PASSWORD-PROTECTED RESOURCE BASED ON PUBLICLY AVAILABLE DATA

BACKGROUND

A password is a combination of characters that is used to authenticate (e.g., provide identity or access approval to) a user to gain access to a resource. The use of passwords remains a ubiquitous part of security challenges in personal and business scenarios. Choosing and maintaining strong passwords presents a challenge. On one hand, security policies often dictate that a password is to meet a security complexity threshold. For example, a security policy may require that the password include at least a threshold number of characters. In another example, the security policy may require that the password include a variety of designated types of characters (e.g., at least one capital letter, at least one lower case letter, and/or at least one special character). In yet another example, the security policy may specify that no character is to be repeated more than a designated number of times. In still another example, the security policy may specify that an account name or other details supplied at the time of password generation are not to be included in the password. On the other hand, the user may be tempted to use passwords that are easy to recall and use.

One common solution for this conundrum is for the user to choose a password based on a mixture of details that are relatively easy to memorize but that the user believes are relatively difficult for a malicious entity to guess. For instance, the details may be relatively difficult for the malicious entity to guess when using a purely random trial-and-error technique. However, it may be relatively easy for the malicious entity to guess such details by using a strategically narrowed list of possibilities.

SUMMARY

Various approaches are described herein for, among other things, increasing security of a password-protected resource based on publicly available data. Examples of a resource include but are not limited to a computer program (e.g., software application), an account, a database, a network, and a website. A computer program may be a local computer program or a cloud-based service. A local computer program is a computer program that is installed and executed entirely on a user device. A cloud-based service is a service (e.g., computer program) that is accessible by a user device via a network (e.g., the Internet). The cloud-based service may be installed and/or executed partially or entirely on a computing system that is external to (e.g., remote from) the user device. A resource may or may not be associated with a designated organization and/or a designated environment. A password-protected resource is a resource for which a password is used to access the resource. Examples of publicly available data include but are not limited to personal details regarding a user, trending events, and local environment variables. Examples of personal details regarding the user include but are not limited to a significant date associated with the user (e.g., wedding anniversary or birthdate of the user, a family member, or a friend; the current year; or the date on which the user started a new job); a name (or nickname) of the user, a family member, or a friend; a name of the user's pet; a name of the user's favorite sports team; and a name of the user's school. Trending events are events that trend online (i.e., on the Internet). Examples of a trending event include but are not limited to a news story, a current sports event, and a memorable date. Examples of a local environment variable include but are not limited to a hometown of the user and a name of a computer program for which a password is being created.

In a first example approach, password generation models are extracted from passwords that are generated by users to access password-protected resource(s). A user password is received to be utilized to access a designated password-protected resource from a user of a computing device. Publicly available data regarding the user is obtained. The password generation models are applied using the publicly available data to generate sample passwords. The sample passwords are caused to be compared to the user password to programmatically determine that the user password and each of one or more determined sample passwords, which are included among the sample passwords, include at least one common element. An alternative password is caused to be recommended for use by the user in lieu of the user password based at least in part on a determination that the user password and each of the one or more determined sample passwords include at least one common element.

In a second example approach, a user password is received to be utilized to access a designated password-protected resource from a user of a computing device. Sample passwords are received that result from application of publicly available data regarding the user to password generation models, which are extracted from passwords that are generated by users to access password-protected resource(s). The sample passwords are compared to the user password to programmatically determine that the user password and each of one or more determined sample passwords, which are included among the sample passwords, include at least one common element. An alternative password is recommended for use by the user in lieu of the user password based at least in part on a determination that the user password and each of the one or more determined sample passwords include at least one common element.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
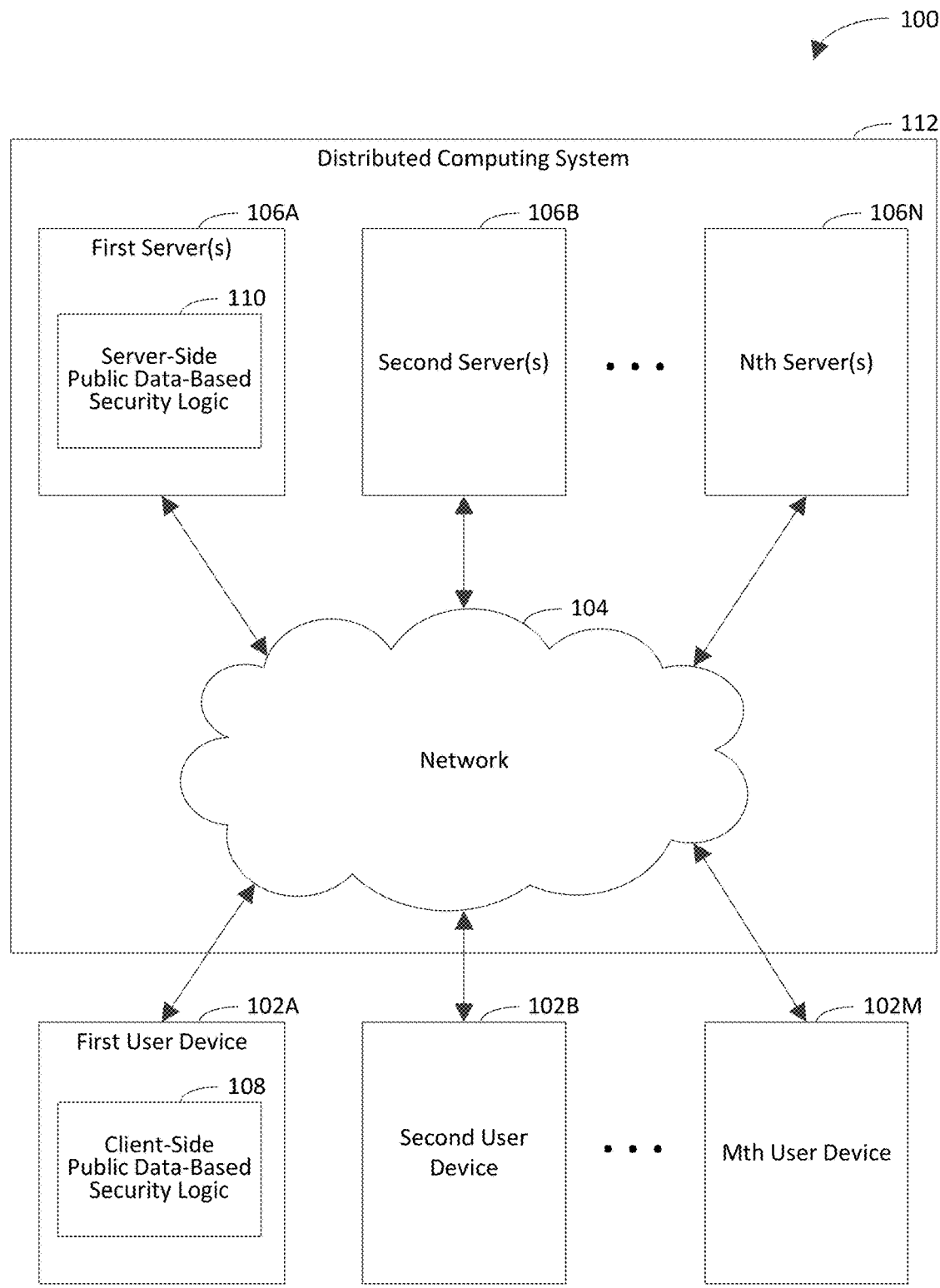
FIG. 1 is a block diagram of an example public data-based security system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

II. Example Embodiments

Example embodiments described herein are capable of increasing security of a password-protected resource based on publicly available data. Examples of a resource include but are not limited to a computer program (e.g., software application), an account, a database, a network, and a website. A computer program may be a local computer program or a cloud-based service. A local computer program is a computer program that is installed and executed entirely on a user device. A cloud-based service is a service (e.g., computer program) that is accessible by a user device via a network (e.g., the Internet). The cloud-based service may be installed and/or executed partially or entirely on a computing system that is external to (e.g., remote from) the user device. A resource may or may not be associated with a designated organization and/or a designated environment. A password-protected resource is a resource for which a password is used to access the resource. Examples of publicly available data include but are not limited to personal details regarding a user, trending events, and local environment variables. Examples of personal details regarding the user include but are not limited to a significant date associated with the user (e.g., wedding anniversary or birthdate of the user, a family member, or a friend; the current year; or the date on which the user started a new job); a name (or nickname) of the user, a family member, or a friend; a name of the user's pet; a name of the user's favorite sports team; and a name of the user's school. Trending events are events that trend online (i.e., on the Internet). Examples of a trending event include but are not limited to a news story, a current sports event, and a memorable date. Examples of a local environment variable include but are not limited to a hometown of the user, a name of a computer program for which a password is being created, and a name of an account for which the password is being created.

Example techniques described herein have a variety of benefits as compared to conventional techniques for providing a password for a password-protected resource. For instance, the example techniques may be capable of recommending an alternative password to be used by a user to access the password-protected resource in lieu of a password that is created by the user based on (e.g., based at least in part on) a determination that the user-created password is capable of being hacked using publicly available data regarding the user (and potentially other data, such as trending data and/or information about a local environment of the user). The example techniques may be capable of increasing security of the password-protected resource, information that the user provides and/or receives form the password-protected resource, and/or a computing system that provides the password-protected resource. For instance, the example techniques may help to avoid breaches of the user's information due to a weak password or reuse of similarly constructed passwords across multiple services. Accordingly, the example techniques may recommend an alternative password that is stronger (e.g., more likely to withstand a hacking attempt) than the password that is created by the user. The example techniques may prevent hacking of a user's password by a hacking technique that uses personal data regarding the user, trending data, and/or information about the local environment of the user, which may be used instead of a brute force hacking technique.

The example techniques may take advantage of the expansive amount of publicly available personal (and other) data that is available on the Web to determine whether the alternative password is to be recommended to the user. Such data may be obtained from legitimate sources (e.g., social networks), results of web scraping tools, and/or data breach dumps. The example techniques may use timestamps associated with at least some information to determine relevance of the information for purposes of generating sample passwords to compare to the password that is created by the user. For instance, the example techniques may recommend the alternative password in response to at least one of the sample passwords and the password that is created by the user including at least one common element. For example, a common element may be a common combination of characters (e.g., a common word or a common date). The example techniques may be capable of gauging complexity of the password that is created by the user by comparing the sample passwords and the password that is created by the user before (or without) providing an encrypted version of the password that is created by the user to a server for further processing. For instance, the comparison may be performed substantially at the moment that the user creates the password.

The example techniques may reduce an amount of time and/or resources (e.g., processor, memory, network bandwidth) that are consumed to manage security of a password-protected resource. For instance, recommending an alternative password to be used to access the password-protected resource in lieu of a user-generated password may reduce a risk that time and/or resources will thereafter be consumed to secure the password-protected resource in response to a malicious entity hacking the user-generated password.

The example embodiments may increase efficiency of a computing system that is used to manage security of a password-protected resource. The example techniques may increase user efficiency (e.g., by reducing a number of steps and/or an amount of time that a user takes to create a secure password for accessing the password-protected resource). For instance, proactively recommending an alternative password to be used in lieu of a user-generated password may reduce (e.g., eliminate) a need for the user to manually create a password that is more secure than the user-generated password.

FIG. 1 is a block diagram of an example public data-based security system 100 in accordance with an embodiment. Generally speaking, public data-based security system 100 operates to provide information to users (e.g., software engineers, application developers, etc.) in response to requests (e.g., hypertext transfer protocol (HTTP) requests) that are received from the users. The information may include documents (e.g., Web pages, images, audio files, video files, etc.), output of executables, and/or any other suitable type of information. In accordance with example embodiments described herein, public data-based security system 100 increases security of a password-protected resource based on publicly available data. Detail regarding techniques for increasing security of a password-protected resource based on publicly available data is provided in the following discussion.

As shown in FIG. 1, public data-based security system 100 includes a plurality of user devices 102A-102M, a network 104, and a plurality of servers 106A-106N. Communication among user devices 102A-102M and servers 106A-106N is carried out over network 104 using well-known network communication protocols. Network 104 may be a wide-area network (e.g., the Internet), a local area network (LAN), another type of network, or a combination thereof. Servers 106A-106N and network 104 are shown to be included in a distributed computing system 112 (e.g., a public cloud or a private cloud).

User devices 102A-102M are processing systems that are capable of communicating with servers 106A-106N. An example of a processing system is a system that includes at least one processor that is capable of manipulating data in accordance with a set of instructions. For instance, a processing system may be a computer, a personal digital assistant, etc. User devices 102A-102M are configured to provide requests to servers 106A-106N for requesting information stored on (or otherwise accessible via) servers 106A-106N. For instance, a user may initiate a request for executing a computer program (e.g., an application) using a client (e.g., a Web browser, Web crawler, or other type of client) deployed on a user device 102 that is owned by or otherwise accessible to the user. In accordance with some example embodiments, user devices 102A-102M are capable of accessing domains (e.g., Web sites) hosted by servers 106A-106N, so that user devices 102A-102M may access information that is available via the domains. Such domains may include Web pages, which may be provided as hypertext markup language (HTML) documents and objects (e.g., files) that are linked therein, for example.

Each of user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more user devices 102A-102M may communicate with any one or more servers 106A-106N.

First user device 102A is shown to include client-side public data-based security logic 108 for illustrative purposes. Client-side public data-based security logic 108 is configured to perform client-side aspects of the example techniques described herein. For instance, client-side public data-based security logic 108 may receive a user password to be utilized to access a designated password-protected resource from a user of first user device 102A. Client-side public data-based security logic 108 may receive sample passwords, which result from application of publicly available data regarding the user to password generation models, from any one or more of servers 106A-106N. For instance, the sample passwords may be received from server-side public data-based security logic 110, which is shown to be included in first server(s) 106A in the embodiment of FIG. 1. The password generation models may be extracted from passwords that are generated by users to access password-protected resource(s). Client-side public data-based security logic 108 may compare the sample passwords to the user password to programmatically determine that the user password and each of one or more determined sample passwords, which are included among the sample passwords, include at least one common element. Client-side public data-based security logic 108 may recommend an alternative password for use by the user in lieu of the user password based at least in part on a determination that the user password and each of the one or more determined sample passwords include at least one common element. Client-side public data-based security logic 108 may notify the user that the user password is not secure based at least in part on the determination that the user password and each of the one or more determined sample passwords include at least one common element. Client-side public data-based security logic 108 may be implemented as a browser (e.g., an Internet browser), though the example embodiments are not limited in this respect.

Servers 106A-106N are processing systems that are capable of communicating with user devices 102A-102M. Servers 106A-106N are configured to execute computer programs (e.g., password-protected resource(s)) that provide information to user devices 102A-102M. For instance, servers 106A-106N may push such information to user devices 102A-102M or provide the information in response to requests that are received from user devices 102A-102M. The requests may be user-generated or generated without user involvement. For example, policies that are applied to a user device are done without explicit user requests. In accordance with this example, the policies are applied in the background even if no user is logged onto the user device. In further accordance with this example, the user device (e.g., an agent thereon) may poll a server for policy on a schedule (e.g., once per hour) or on events (e.g., device wakeup, user unlock, etc.). In further accordance with this example, the server may push the policy to the user device (e.g., an agent thereon) via an open HTTP endpoint. The information provided by servers 106A-106N may include documents (e.g., Web pages, images, audio files, video files, etc.), output of executables, or any other suitable type of information. In accordance with some example embodiments, servers 106A-106N are configured to host respective Web sites, so that the Web sites are accessible to users of public data-based security system 100.

First server(s) 106A is shown to include server-side public data-based security logic 110 for illustrative purposes. Server-side public data-based security logic 110 is configured to perform server-side aspects of the example techniques described herein. For instance, server-side public data-based security logic 110 may extract password generation models from passwords (e.g., hashed versions of the passwords) that are generated by users to access one or more password-protected resources. Server-side public data-based security logic 110 may receive a user password (e.g., a hashed version of the user password) to be utilized to access the designated password-protected resource from a user of a computing device (e.g., computing device 102A). Server-side public data-based security logic 110 may obtain publicly available data regarding the user from source(s). For instance, the source(s) may be included in any one or more of severs 106A-106N. Server-side public data-based security logic 110 may apply the password generation models using the publicly available data to generate sample passwords. Server-side public data-based security logic 110 may cause the sample passwords to be compared to the user password to programmatically determine that the user password and each of one or more determined sample passwords, which are included among the sample passwords, include at least one common element. Server-side public data-based security logic 110 may cause an alternative password to be recommended for use by the user in lieu of the user password based at least in part on a determination that the user password and each of the one or more determined sample passwords include at least one common element. Server-side public data-based security logic 110 may cause the user to be notified that the user password is not secure based at least in part on the determination that the user password and each of the one or more determined sample passwords include at least one common element Although client-side public data-based security logic 108 and server-side public data-based security logic 110 are described as performing client-side aspects and server-side aspects, respectively, of the example techniques described herein, it will be recognized that any one or more of the client-side aspects of the example techniques described herein may be performed by server-side public data-based security logic 110, and any one or more of the server-side aspects of the example techniques described herein may be performed by client-side public data-based security logic 108.

Each of client-side public data-based security logic 108 and server-side public data-based security logic 110 may be implemented in various ways to increase security of a password-protected resource based on publicly available data, including being implemented in hardware, software, firmware, or any combination thereof. For example, each of client-side public data-based security logic 108 and server-side public data-based security logic 110 may be implemented as computer program code configured to be executed in one or more processors. In another example, each of client-side public data-based security logic 108 and server-side public data-based security logic 110 may be at least partially implemented as hardware logic/electrical circuitry. For instance, each of client-side public data-based security logic 108 and server-side public data-based security logic 110 may be at least partially implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Client-side public data-based security logic 108 is shown to be incorporated in first user device 102A for illustrative purposes and is not intended to be limiting. It will be recognized that client-side public data-based security logic 108 may be incorporated in any of the user devices 102A-102M. Server-side public data-based security logic 110 is shown to be incorporated in first server(s) 106A for illustrative purposes and is not intended to be limiting. It will be recognized that server-side public data-based security logic 110 may be incorporated in any one or more of the servers 106A-106N.

Figure 2:
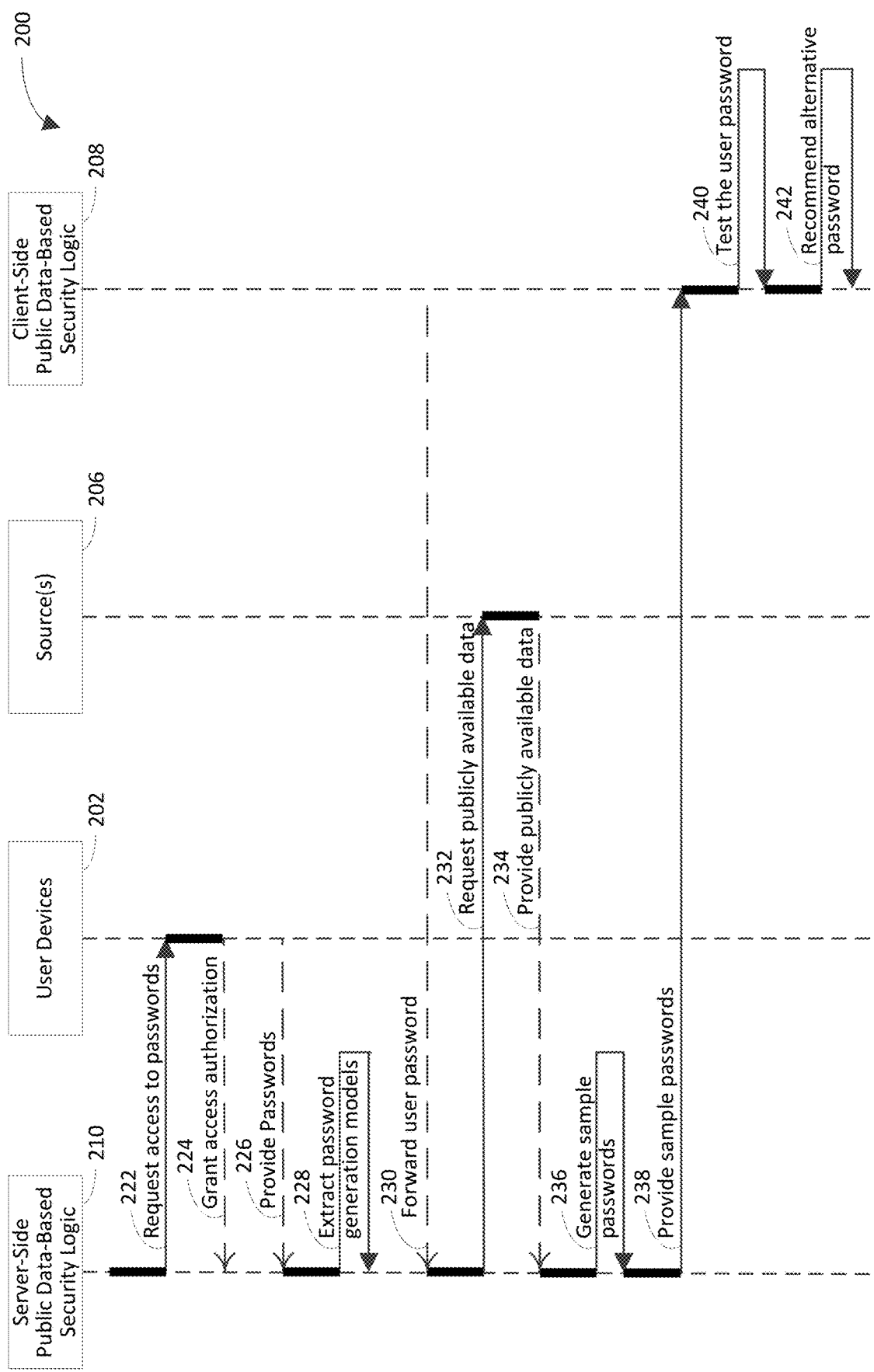
FIG. 2 is an example activity diagram in accordance with an embodiment.

FIG. 2 is an example activity diagram 200 in accordance with an embodiment. FIG. 2 depicts user devices 202, source(s) 206, client-side public data-based security logic 208, and server-side public data-based security logic 210. Client-side public data-based security logic 208 may be included in one of user devices 202, though the scope of the example embodiments is not limited in this respect. Activities 222, 224, 226, 228, 230, 232, 234, 236, 238, 240, and 242 will now be described with reference to user devices 202, source(s) 206, client-side public data-based security logic 208, and server-side public data-based security logic 210.

In activity 222, server-side public data-based security logic 210 requests access to passwords of users who are associated with user devices 202. It should be noted that unencrypted versions of the passwords may not be accessible to server-side public data-based security logic 210. Accordingly, the request may be to access encrypted (e.g., hashed) versions of the passwords.

In activity 224, user devices 202 grant authorization for server-side public data-based security logic 210 to access the passwords of the users. For instance, user devices 202 may authorize server-side public data-based security logic 210 to access the passwords based on instructions that are received from the users. The instructions from the users may indicate that the users wish to provide access to their passwords in return for the ability to receive recommended passwords from server-side public data-based security logic 210 when passwords that are created by the users are deemed by server-side public data-based security logic 210 to be too easy to hack.

In activity 226, user devices 202 provide the passwords (e.g., encrypted versions of the passwords) to server-side public data-based security logic 210. For instance, server-side public data-based security logic 210 may retrieve the passwords from user devices 202 (e.g., in real-time) in response to receipt of notifications from the user devices 202 that the users are creating the passwords. Server-side public data-based security logic 210 may use a data mining algorithm to gather the passwords (e.g., from a plurality of platforms).

In activity 228, server-side public data-based security logic 210 extracts password generation models from the passwords that are received from user devices 202. For instance, the password generation models may be based on categories of information that are included in the passwords.

Examples of a category of information that may be included in a password include but are not limited to a name of the user, a name of a pet of the user, a date (e.g., year) of birth of the user (or spouse of the user), a date on which the user was married, the current year, a name of a computer program or account with which the password corresponds, and information (e.g., a word) that is trending online.

Server-side public data-based security logic 210 may use a natural language processing technique (e.g., with input from publicly available social media) to extract the password generation models from the passwords that are received from user devices 202. For instance, server-side public data-based security logic 210 may use a natural language processing technique to identify the categories of information that are included in the passwords. A natural language processing technique is an artificial intelligence technique that is capable of processing and analyzing natural language data. For instance, the natural language processing technique may utilize a lexicon and/or a grammar of a human language to process and analyze the natural language data. The natural language processing technique may be configured to parse words from the natural language data and to determine the meaning to be attributed to the words based on context that is derived from processing and analyzing the natural language data. The natural language data may include one or more portions (e.g., an entirety) of a password, a social networking update, trending online content, etc.

Some examples of a password generation model that may be extracted from the passwords that are received from user devices 202 include but are not limited to <firstName+birthdate+favoriteSportsTeam> and <currentYear+petName+startNewJobDate>. These example password generation models are provided for illustrative purposes and are not intended to be limiting.

In activity 230, client-side public data-based security logic 208 forwards a user password that is received from a user who owns or controls a user system that includes client-side public data-based security logic 208 to server-side public data-based security logic 210. Client-side public data-based security logic 208 may encrypt the user password before forwarding the user password to server-side public data-based security logic 210 (e.g., in compliance with a security policy that is configured to protect passwords of users from being hacked by server-side processes and systems). Client-side public data-based security logic 208 may provide information that identifies (e.g., uniquely identifies) the user in addition to the password to server-side public data-based security logic 210.

In activity 232, server-side public data-based security logic 210 requests publicly available data regarding the user from source(s) 206. For instance, server-side public data-based security logic 201 may use the information received from client-side public data-based security logic 208 that identifies the user to request the publicly available data regarding the user. For example, server-side public data-based security logic 210 may identify the publicly available data regarding the user based on the information that identifies the user.

In activity 234, source(s) 206 provide the publicly available data regarding the user to server-side public data-based security logic 210.

In activity 236, server-side public data-based security logic 210 generates sample passwords by applying the password generation models, which are extracted in activity 228, using the publicly available data, which is provided by source(s) 206 in activity 234. Server-side public data-based security logic 210 may order the sample passwords based on a probability of each sample password to be used by the user. For instance, server-side public data-based security logic 210 may use a machine learning technique (e.g., a genetic algorithm) to determine the probability of each sample password to be used by the user. Further detail regarding machine learning techniques is provided below with reference to FIG. 3.

In activity 238, server-side public data-based security logic 210 provides the sample passwords to client-side public data-based security logic 208.

In activity 240, client-side public data-based security logic 208 tests the user password using the sample passwords by comparing the sample passwords to the user password to programmatically determine that the user password and each of one or more determined sample passwords, which are included among the sample passwords, include at least one common element. For example, client-side public data-based security logic 208 may compare the sample passwords to the user password in an order that is based on the probability of each sample password to be used by the user. In accordance with this example, client-side public data-based security logic 208 may compare the sample password having the highest probability to the user password, then compare the sample password having the next-highest probability to the user password, and so on. In further accordance with this example, client-side public data-based security logic 208 may determine that a complexity of the user password corresponds to (e.g., is proportional to) a time that is consumed to determine the user password by comparing the sample passwords to the user password.

In activity 242, client-side public data-based security logic 208 recommends an alternative password for use by the user in lieu of the user password. For instance, client-side public data-based security logic 208 may recommend the alternative password based at least in part on a determination that the user password and each of the one or more determined sample passwords include at least one common element. In one example, client-side public data-based security logic 208 may recommend the alternative password further based at least in part on the complexity of the user password being less than or equal to a lower complexity threshold. Although the alternative password may not be included among the sample passwords, it may be desirable for the alternative password to be relatively easy for the user to remember. For instance, client-side public data-based security logic 208 may select the alternative password to have a complexity that is greater than the complexity of the user password but less than an upper complexity threshold. The lower complexity threshold and/or the upper complexity threshold may be predetermined and/or fixed, though the scope of the example embodiments is not limited in this respect.

In some example embodiments, one or more activities 222, 224, 226, 228, 230, 232, 234, 236, 238, 240, and/or 242 of activity diagram 200 may not be performed. Moreover, activities in addition to or in lieu of activities 222, 224, 226, 228, 230, 232, 234, 236, 238, 240, and/or 242 may be performed. It will be recognized that some activities may be combined and/or performed in parallel.

For instance, in an example embodiment, in addition to or in lieu of activities 222, 224, and 226, server-side public data-based security logic 210 provides a request to client-side public data-based security logic 208, requesting that the user provide a list of example passwords. For example, the request may solicit a designated number of example passwords (e.g., 100 example passwords) to be analyzed by server-side public data-based security logic 210. In accordance with this embodiment, in activity 228, server-side public data-based security logic 210 extracts the password generation models from the example passwords in addition to or in lieu of the passwords that are described above as being provided by user devices 202 in activity 226.

Figure 3:
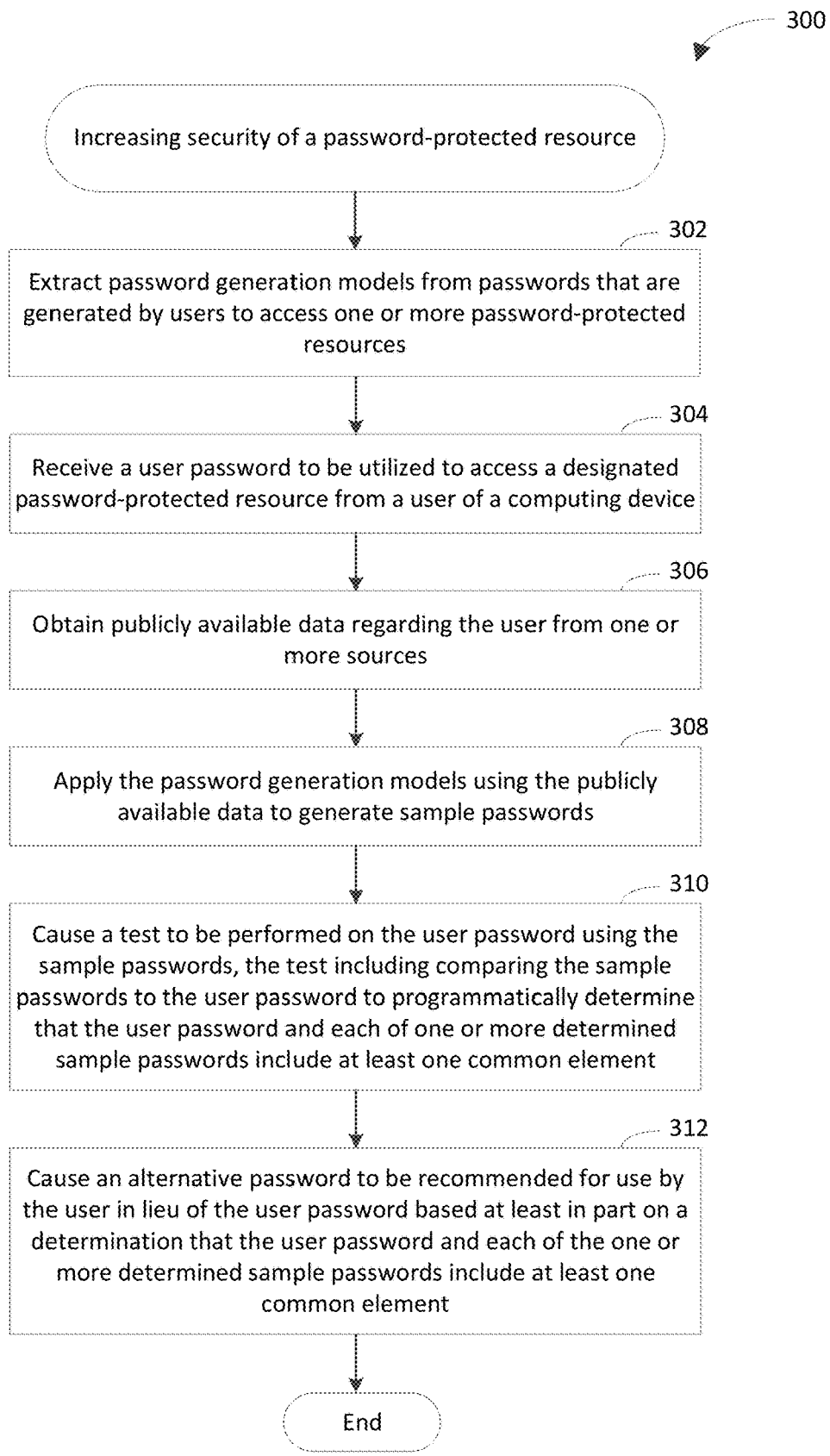
FIGS. 3 and 5 depict flowcharts of example methods for increasing security of a password-protected resource in accordance with embodiments.
Figure 4:
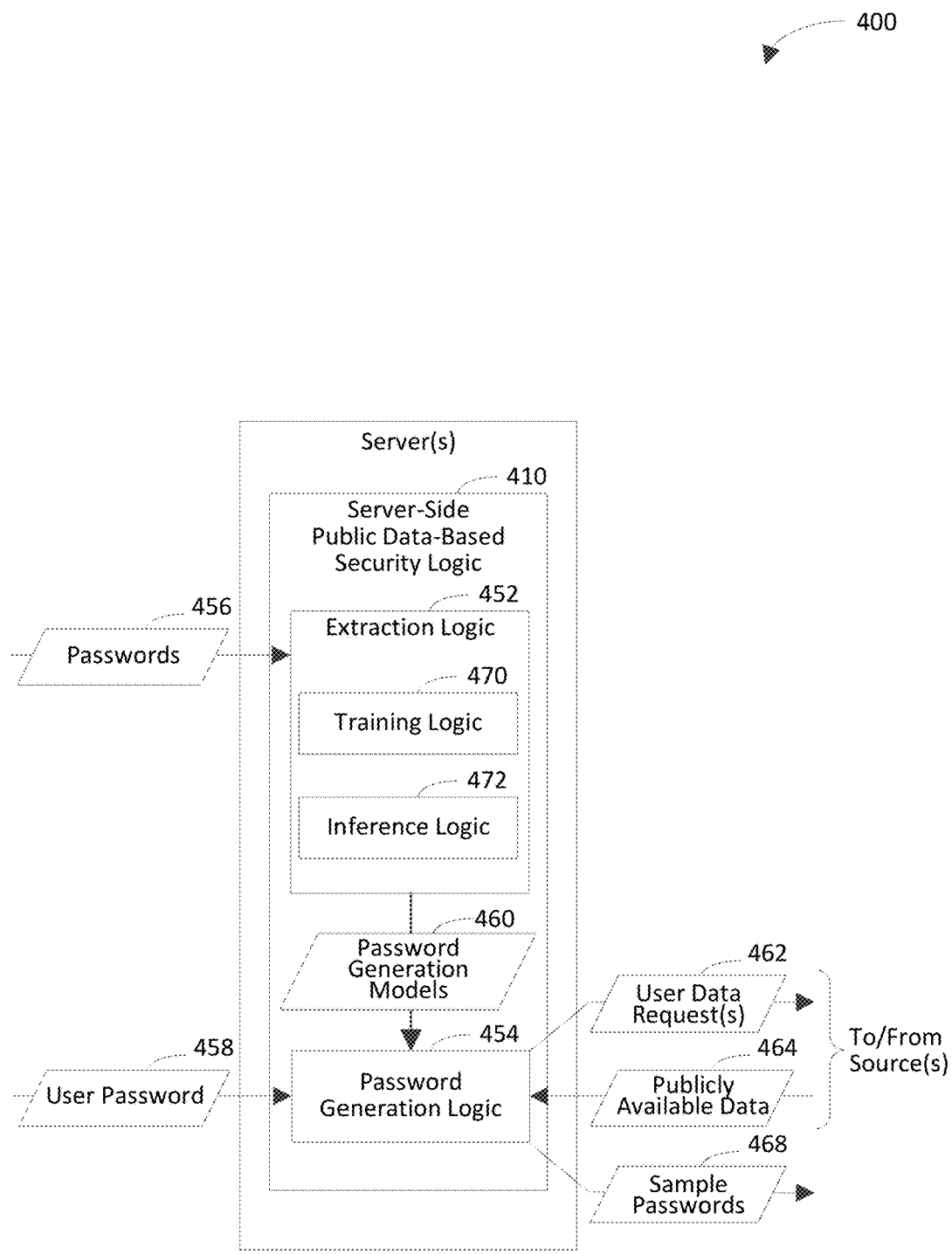
FIG. 4 is a block diagram of an example implementation of server(s) shown in FIG. 1 in accordance with an embodiment.

FIG. 3 depicts a flowchart 300 of an example method for increasing security of a password-protected resource in accordance with an embodiment. Flowchart 300 may be performed by server-side public data-based security logic 110 shown in FIG. 1, for example. For illustrative purposes, flowchart 300 is described with respect to server(s) 400 shown in FIG. 4. Server(s) 400 may include one or more of servers 106A-106N, though the scope of the example embodiments is not limited in this respect. Server(s) 400 includes server-side public data-based security logic 410, which is an example of server-side public data-based security logic 110, according to an embodiment. As shown in FIG. 4, server-side public data-based security logic 410 includes extraction logic 452 and password generation logic 454. Extraction logic 452 includes training logic 470 and inference logic 472. Further structural and operational embodiments will be apparent to persons skilled in the relevant art(s) based on the discussion regarding flowchart 300.

As shown in FIG. 3, the method of flowchart 300 begins at step 302. In step 302, password generation models are extracted from passwords that are generated by users to access one or more password-protected resources (e.g., a plurality of password-protected resources). The password generation models may be extracted from encrypted (e.g., hashed) versions of the passwords, though the example embodiments are not limited in this respect. In an example implementation, extraction logic 452 extracts password generation models 460 from passwords 456 that are generated by the users to access the one or more password-protected resources.

In an example embodiment, the passwords from which the password generation models are extracted include at least one password generated by at least one user utilizing a password changing user interface. A password changing user interface is a user interface that enables a user to change a password. For example, the password changing user interface may include multiple fields in which the user is to enter requested information. For example, the password changing user interface may indicate that the user is to enter the user's current password in a first field, a confirmation of the user's current password in a second field, and a new password that the user intends to replace the user's current password in a third field.

In another example embodiment, the password generation models may be extracted from the passwords using a natural language processing technique. More detail regarding the use of a natural language processing technique is provided above with reference to FIG. 2.

At step 304, a user password is received to be utilized to access the designated password-protected resource from a user of a computing device. In an example implementation, password generation logic 454 receives user password 458 to be utilized to access the designated password-protected resource from the user.

At step 306, publicly available data regarding the user is obtained from one or more sources. Examples of a source include but are not limited to a social media service and a company profile of the user. A social media service is a service that facilitates the building of social networks (e.g., social relations) among people who share interests, activities, backgrounds, real-life connections, etc. Examples of a social networking environment include but are not limited to Badoo®, developed and distributed by Badoo Trading Limited; Facebook®, developed and distributed by Facebook, Inc.; Google+®, developed and distributed by Google LLC; Linkedin®, developed and distributed by Microsoft Corporation; Instagram®, developed and distributed by Facebook, Inc.; Renren™, developed and distributed by Renren Inc.; Twitter®, developed and distributed by Twitter, Inc.; and Vkontakte™, developed and distributed by Vkontakte Ltd. At least some of the publicly available data may be obtained from social updates of the user and/or social updates of other users that reference the user. A company profile of a user is a profile of a user that lists information about the user and that associates the user with an organization. For instance, the organization may employ the user. In an example implementation, password generation logic 454 obtains publicly available data 464 regarding the user from the one or more sources. For example, password generation logic 454 may generate user data request(s) 462 that request the publicly available data. In accordance with this example, password generation logic 454 may provide the user data request(s) 462 to the one or more sources. In further accordance with this example, password generation logic 454 receives the publicly available data 264 from the one or more sources in response providing the user data request(s) 462 to the one or more sources.

At step 308, the password generation models are applied using the publicly available data to generate sample passwords. For instance, it may be said that the publicly available data is applied to the password generation models to generate the sample passwords. In an example implementation, password generation logic 454 applies the password generation models 460 using the publicly available data 464 to generate sample passwords 468.

In an example embodiment, the password generation models are applied at step 308 using the publicly available data regarding the user and other information to generate the sample passwords. For example, the other information may include one or more items of content (e.g., one or more news items) that are trending online, information regarding one or more current events, and/or information regarding a local environment of the user. In accordance with this example, items of content that are trending online and current events may be identified based on a timestamp associated with the user password. Time stamps associated with trending items and other events may be compared to the timestamp associated with the user password to determine whether the trending items and other events are to be included in the other information. If a difference between a time indicated by a timestamp associated with a trending item or other event and a time indicated by the timestamp associated with the user password is less than or equal to a threshold time difference, then the trending item or other event may be included in the other information; otherwise, the trending item or other event may not be included in the other information. The threshold time difference can be any suitable time, including but not limited to one hour, one day, three days, one week, two weeks, or one month.

At step 310, a test is caused to be performed on the user password using the sample passwords. The test includes comparing the sample passwords to the user password to programmatically determine that the user password and each of one or more determined sample passwords, which are included among the sample passwords, include at least one common element. In an example implementation, password generation logic 454 causes the test to be performed on the user password 458 using the sample passwords 468. For instance, password generation logic 454 may trigger a user device (e.g., client-side public data-based security logic therein) to perform the test by sending the sample passwords 468 to the user device.

At step 312, an alternative password is caused to be recommended for use by the user in lieu of the user password based at least in part on a determination that the user password and each of the one or more determined sample passwords include at least one common element. In an example implementation, password generation logic 454 causes the alternative password to be recommended for use by the user in lieu of the user password 458. For instance, password generation logic 454 may trigger the user device to recommend the alternative password in lieu of the user password 458 by sending the sample passwords 468 to the user device.

In an example embodiment, the one or more determined sample passwords have one or more respective first estimated probabilities of being used by the user. In accordance with this embodiment, the alternative password has a second estimated probability of being used by the user that is less than each of the one or more first estimated probabilities. In further accordance with this embodiment, causing the alternative password to be recommended at step 312 is further based at least in part on the second estimated probability of the alternative password being less than each of the one or more first estimated probabilities of the one or more respective determined sample passwords.

In an aspect of this embodiment, causing the alternative password to be recommended at step 312 may be further based at least in part on the second estimated probability being less than a fixed threshold probability. In accordance with this aspect, the fixed threshold probability is independent from the one or more first estimated probabilities of the one or more respective determined sample passwords. For instance, the fixed threshold probability may be less than each of the one or more first estimated probabilities.

In another aspect of this embodiment, the first estimated probability of each of the one or more determined sample passwords is based at least in part on a number of the passwords that correspond to the password generation model from which the determined sample password is generated. For example, a relatively greater number of the passwords corresponding to a password generation model may correspond to (e.g., result in) a relatively greater first estimated probability of the determined sample password that is generated from the password generation model. In another example, a relatively lesser number of the passwords corresponding to a password generation model may correspond to a relatively lesser first estimated probability of the determined sample password that is generated from the password generation model.

In an example machine learning embodiment, extracting the password generation models from the passwords at step 302 includes identifying (e.g., inferring) categories of data regarding the users in the passwords by analyzing the passwords using a machine learning technique. A machine learning technique is a technique by which a computing system learns from data to enable the computing system to make data-driven decisions (e.g., predictions) without having to be explicitly programmed. In accordance with the machine learning embodiment, extracting the password generation models from the passwords at step 302 further includes defining the password generation models using the machine learning technique based at least in part on respective combinations of at least some of the categories. In further accordance with the machine learning embodiment, applying the password generation models at step 308 includes applying the publicly available data regarding the user to corresponding categories to generate the sample passwords. For example, applying the password generation models at step 308 may include parsing the publicly available data into portions that correspond to respective categories that are identified by analyzing the passwords using the machine learning technique. In accordance with this example, applying the password generation models at step 308 may further include applying the portions of the publicly available data to the respective categories to generate the sample passwords.

In some aspects of the machine learning embodiment, extraction logic 452 uses a neural network to perform the machine learning technique. Examples of a neural network include but are not limited to a feed forward neural network and a long short-term memory (LSTM) neural network. A feed forward neural network is an artificial neural network for which connections between units in the neural network do not form a cycle. The feed forward neural network allows data to flow forward (e.g., from the input nodes toward to the output nodes), but the feed forward neural network does not allow data to flow backward (e.g., from the output nodes toward to the input nodes). In an example aspect, extraction logic 452 may employ a feed forward neural network to train the machine learning model that is used to identify the categories of data regarding the users in the passwords (e.g., passwords 456) and that is further used to define the password generation models (e.g., password generation models 460). An LSTM neural network is a recurrent neural network that has memory and allows data to flow forward and backward in the neural network. The LSTM neural network is capable of remembering values for short time periods or long time periods. Accordingly, the LSTM neural network may keep stored values from being iteratively diluted over time.

Training logic 470 is configured to train the machine learning algorithm that inference logic 472 uses to define the password generation models 460. For instance, training logic 470 may provide sample data, which may include the passwords, sample information regarding users, and/or sample categories, as inputs to the algorithm to train the algorithm. For instance, the sample data may be labeled. The machine learning algorithm may be configured to derive relationships between portions of the passwords, the sample information regarding users, and/or the sample categories.

Inference logic 472 is configured to utilize the machine learning algorithm, which is trained by training logic 470, to define the password generation models 460. For instance, inference logic 472 may define the password generation models 460 to include the respective combinations of at least some of the categories identified in the passwords 456 when the passwords, the sample information regarding users, and/or the sample categories are provided as inputs to the algorithm.

In a first password protection embodiment, receiving the user password at step 304 includes receiving a hashed version of the user password. In accordance with this embodiment, the test includes comparing hashed versions of the sample passwords to the hashed version of the user password to programmatically determine that the user password and each of the one or more determined sample passwords include at least one common element.

In a second password protection embodiment, receiving the user password at step 304 includes collecting anonymized data, which includes the user password, from the computing device.

In some example embodiments, one or more steps 302, 304, 306, 308, 310, and/or 312 of flowchart 300 may not be performed. Moreover, steps in addition to or in lieu of steps 302, 304, 306, 308, 310, and/or 312 may be performed.

It will be recognized that server(s) 400 may not include one or more of extraction logic 452, password generation logic 454, training logic 470, and/or inference logic 472. Furthermore, server(s) 400 may include components in addition to or in lieu of server-side public data-based security logic 410, extraction logic 452, password generation logic 454, training logic 470, and/or inference logic 472.

Figure 5:
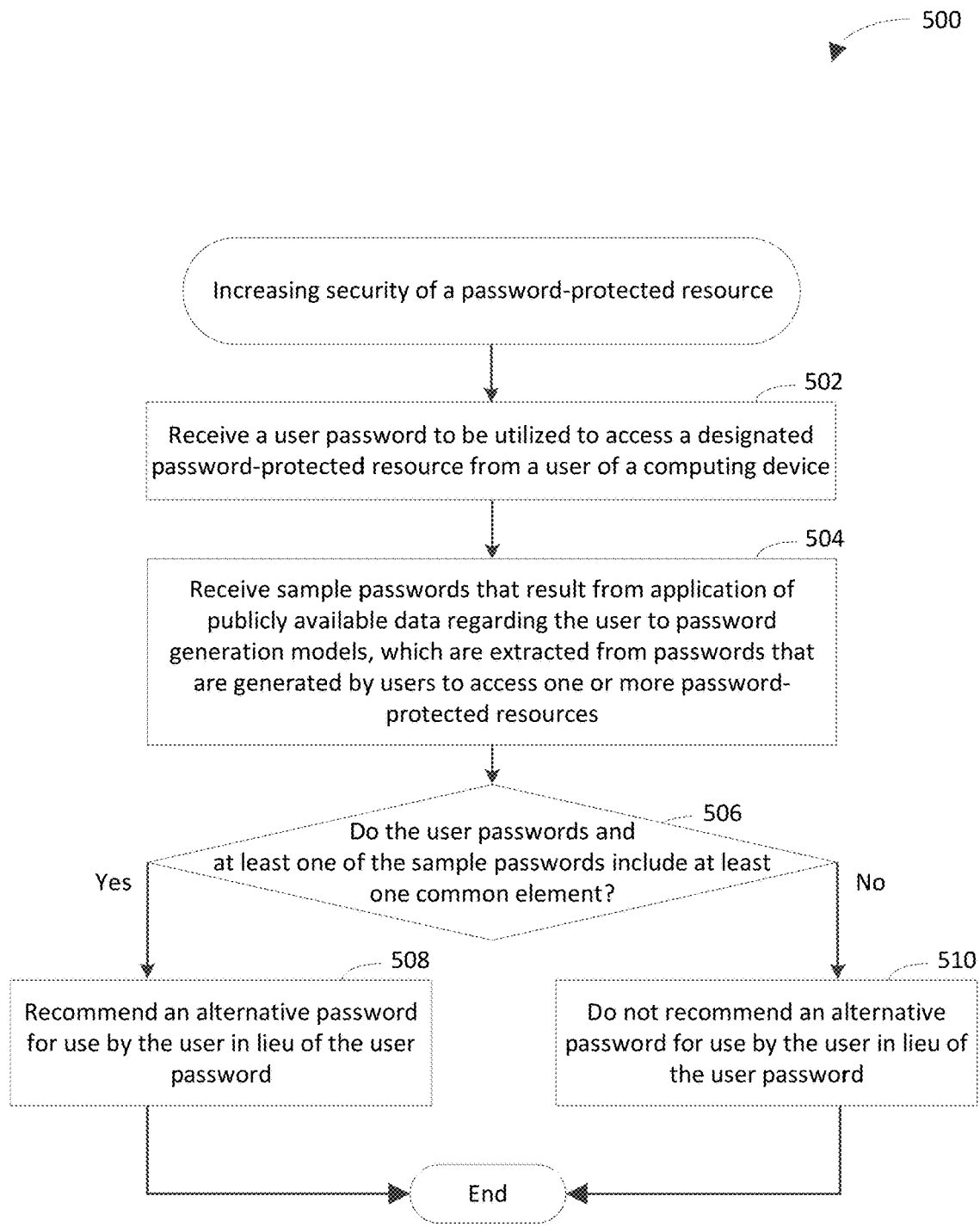
Figure 6:
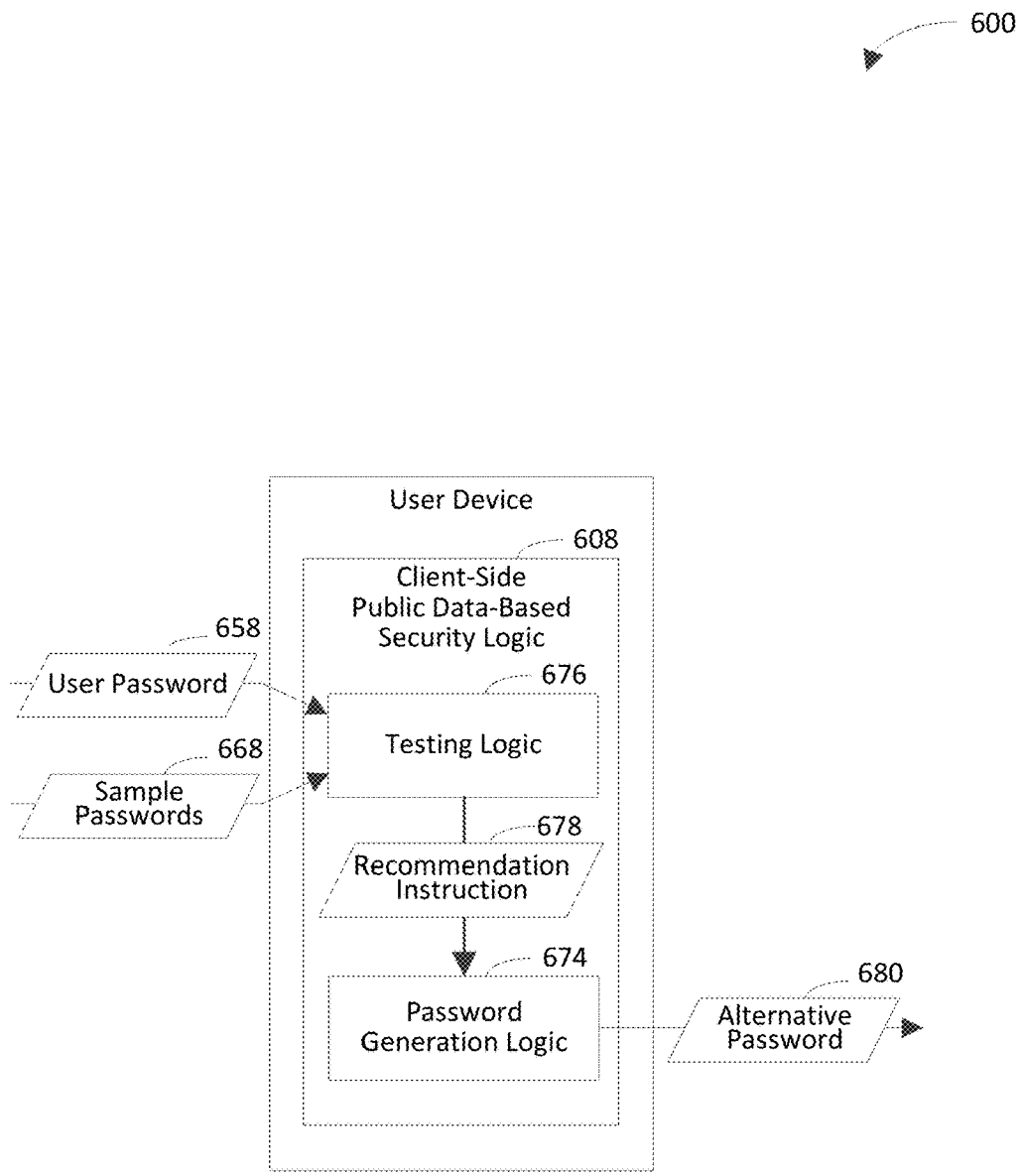
FIG. 6 is a block diagram of an example implementation of a user device shown in FIG. 1 in accordance with an embodiment.

FIG. 5 depicts a flowchart 500 of another example method for increasing security of a password-protected resource in accordance with an embodiment. Flowchart 500 may be performed by client-side public data-based security logic 108 shown in FIG. 1, for example. For illustrative purposes, flowchart 500 is described with respect to user device 600 shown in FIG. 6. User device 600 may include one or more of user devices 102A-102M, though the scope of the example embodiments is not limited in this respect. User device 600 includes client-side public data-based security logic 608, which is an example of client-side public data-based security logic 108, according to an embodiment. As shown in FIG. 6, client-side public data-based security logic 608 includes testing logic 676 and password generation logic 674. Further structural and operational embodiments will be apparent to persons skilled in the relevant art(s) based on the discussion regarding flowchart 500.

As shown in FIG. 5, the method of flowchart 500 begins at step 502. In step 502, a user password is received from a user of a computing device to be utilized to access the designated password-protected resource. In an example implementation, testing logic 676 receives a user password 658 from the user of user device 600 to be utilized to access the designated password-protected resource.

At step 504, sample passwords are received that result from application of publicly available data regarding the user to password generation models, which are extracted from passwords that are generated by users to access one or more password-protected resources. One or more of the passwords may be generated by user(s) via a password changing user interface, though the scope of the example embodiments is not limited in this respect. The publicly available data regarding the user may be obtained from any one or more suitable sources. For example, at least a portion of the publicly available data regarding the user may be obtained from at least one social media service. In another example, at least a portion of the publicly available data regarding the user may be obtained from a company profile of the user. One or more of the password generation models may be extracted from the passwords using a natural language processing technique, though the scope of the example embodiments is not limited in this respect.

In an example implementation, testing logic 676 receives sample passwords 668 that result from application of the publicly available data (e.g., publicly available data 464) regarding the user to the password generation models (e.g., password generation models 460).

In an example embodiment, the sample passwords result from application of the publicly available data regarding the user to the password generation models, which are extracted from the passwords using a machine learning technique that identifies categories of data regarding the users in the passwords and that defines the password generation models based at least in part on respective combinations of at least some of the categories.

In another example embodiment, the sample passwords result from application of the publicly available data regarding the user and one or more other types of information to the password generation models. The other types of information include but are not limited to items of content that are trending online, information regarding one or more current events, and information regarding a local environment of the user.

At step 506, a determination is made whether the user password and at least one of the sample passwords include at least one common element. For example, step 506 may include testing the user password using the sample passwords. In accordance with this example, the testing may include comparing the sample passwords to the user password to programmatically determine that the user password and each of one or more determined sample passwords, which are included among the sample passwords, include at least one common element. If the user password and at least one of the sample passwords include at least one common element, control flows to step 508. Otherwise, control flows to step 510. In an example implementation, testing logic 676 determines whether the user password 658 and at least one of the sample passwords 668 include at least one common element. In a first aspect of this implementation, testing logic 676 may generate a recommendation instruction 678 having a value that depends on whether the user password 658 and at least one of the sample passwords 668 include at least one common element. For instance, the recommendation instruction 678 may have a first value if the user password 658 and at least one of the sample passwords 668 include at least one common element; otherwise, the recommendation instruction 678 may have a second value that is different from the first value. In a second aspect of this implementation, testing logic 676 may generate the recommendation instruction 678 based on the user password 658 and at least one of the sample passwords 668 including at least one common element. In accordance with the second aspect, testing logic 676 may not generate the recommendation instruction 678 based on the user password 658 not having any elements in common with at least one of the sample passwords 668.

At step 508, an alternative password is recommended for use by the user in lieu of the user password. Upon completion of step 508, flowchart 500 ends. In an example implementation, password generation logic 674 recommends an alternative password 680 for use by the user in lieu of the user password 658. For example, password generation logic 674 may recommend the alternative password 680 based on receipt of the recommendation instruction 678 or based on the recommendation instruction 678 having the first value described above with reference to step 506.

At step 510, an alternative password is not recommended for use by the user in lieu of the user password. In an example implementation, password generation logic 674 does not recommend the alternative password 680 for use by the user in lieu of the user password 658. For example, password generation logic 674 may not recommend the alternative password 680 based on not receiving the recommendation instruction 678 or based on the recommendation instruction 678 having the second value described above with reference to step 506.

In an example embodiment, the one or more determined sample passwords have one or more respective first estimated probabilities of being used by the user, and the alternative password has a second estimated probability of being used by the user. In accordance with this embodiment, the second probability is less than each of the one or more first estimated probabilities. In further accordance with this embodiment, recommending the alternative password at step 508 is further based at least in part on the second estimated probability of the alternative password being less than each of the one or more first estimated probabilities of the one or more respective determined sample passwords. In an aspect of this embodiment, the first estimated probability of each of the one or more determined sample passwords is based at least in part on a number of the passwords that are generated by the users that correspond to the password generation model from which the determined sample password is generated. In another aspect of this embodiment, recommending the alternative password at step 508 is further based at least in part on the second estimated probability being less than a fixed threshold probability. For example, the fixed threshold probability may be less than each of the one or more first estimated probabilities.

In some example embodiments, one or more steps 502, 504, 506, 508, and/or 510 of flowchart 500 may not be performed. Moreover, steps in addition to or in lieu of steps 502, 504, 506, 508, and/or 510 may be performed.

It will be recognized that user device 600 may not include one or more of testing logic 676 and/or password generation logic 674. Furthermore, user device 600 may include components in addition to or in lieu of client-side public data-based security logic 608, testing logic 676, and/or password generation logic 674.

Flowchart 300 is described above from the perspective of server(s) for non-limiting, illustrative purposes. It will be recognized that any one or more of the steps described herein with reference to flowchart 300 may be performed by a user device. Flowchart 500 is described above from the perspective of a user device for non-limiting, illustrative purposes. It will be recognized that any one or more of the steps described herein with reference to flowchart 500 may be performed by server(s).

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of client-side public data-based security logic 108, server-side public data-based security logic 110, source(s) 206, client-side public data-based security logic 208, server-side public data-based security logic 210, server-side public data-based security logic 410, extraction logic 452, password generation logic 454, training logic 470, inference logic 472, client-side public data-based security logic 608, testing logic 676, password generation logic 674, activity diagram 200, flowchart 300, and/or flowchart 500 may be implemented in hardware, software, firmware, or any combination thereof.

For example, any one or more of client-side public data-based security logic 108, server-side public data-based security logic 110, source(s) 206, client-side public data-based security logic 208, server-side public data-based security logic 210, server-side public data-based security logic 410, extraction logic 452, password generation logic 454, training logic 470, inference logic 472, client-side public data-based security logic 608, testing logic 676, password generation logic 674, activity diagram 200, flowchart 300, and/or flowchart 500 may be implemented, at least in part, as computer program code configured to be executed in one or more processors.

In another example, any one or more of client-side public data-based security logic 108, server-side public data-based security logic 110, source(s) 206, client-side public data-based security logic 208, server-side public data-based security logic 210, server-side public data-based security logic 410, extraction logic 452, password generation logic 454, training logic 470, inference logic 472, client-side public data-based security logic 608, testing logic 676, password generation logic 674, activity diagram 200, flowchart 300, and/or flowchart 500 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Further Discussion of Some Example Embodiments

A first example system to increase security of a designated password-protected resource comprises memory and one or more processors coupled to the memory. The one or more processors are configured to extract password generation models from passwords that are generated by users to access one or more password-protected resources. The one or more processors are further configured to receive a user password to be utilized to access the designated password-protected resource from a user of a computing device. The one or more processors are further configured to obtain publicly available data regarding the user from one or more sources. The one or more processors are further configured to increase the security of the designated password-protected resource (a) by applying the password generation models using the publicly available data to generate sample passwords, (b) further by causing a test to be performed on the user password using the sample passwords, the test including comparing the sample passwords to the user password to programmatically determine that the user password and each of one or more determined sample passwords, which are included among the sample passwords, include at least one common element, and (c) further by causing an alternative password to be recommended for use by the user in lieu of the user password based at least in part on a determination that the user password and each of the one or more determined sample passwords include at least one common element.

In a first aspect of the first example system, the one or more processors are configured to identify categories of data regarding the users in the passwords, which are generated by the users to access the one or more password-protected resources, by analyzing the passwords using a machine learning technique. In accordance with the first aspect, the one or more processors are configured to define the password generation models using the machine learning technique based at least in part on respective combinations of at least some of the categories. In further accordance with the first aspect, the one or more processors are configured to apply the publicly available data regarding the user to corresponding categories to generate the sample passwords.

In a second aspect of the first example system, the one or more processors are configured to extract the password generation models from the passwords that include at least one password generated by at least one user utilizing a password changing user interface. The second aspect of the first example system may be implemented in combination with the first aspect of the first example system, though the example embodiments are not limited in this respect.

In a third aspect of the first example system, the one or more processors are configured to extract the password generation models, utilizing a natural language processing technique, from the passwords that are generated by the users. The third aspect of the first example system may be implemented in combination with the first and/or second aspect of the first example system, though the example embodiments are not limited in this respect.

In a fourth aspect of the first example system, the one or more determined sample passwords have one or more respective first estimated probabilities of being used by the user. In accordance with the fourth aspect, the alternative password has a second estimated probability of being used by the user that is less than each of the one or more first estimated probabilities. In further accordance with the fourth aspect, the one or more processors are configured to cause the alternative password to be recommended for use by the user in lieu of the user password further based at least in part on the second estimated probability of the alternative password being less than each of the one or more first estimated probabilities of the one or more respective determined sample passwords. The fourth aspect of the first example system may be implemented in combination with the first, second, and/or third aspect of the first example system, though the example embodiments are not limited in this respect.

In a first implementation of the fourth aspect of the first example system, the one or more processors are configured to cause the alternative password to be recommended for use by the user in lieu of the user password further based at least in part on the second estimated probability being less than a fixed threshold probability.

In a second implementation of the fourth aspect of the first example system, the first estimated probability of each of the one or more determined sample passwords is based at least in part on a number of the passwords, which are generated by the users to access the one or more password-protected resources, that correspond to the password generation model from which the determined sample password is generated.

In a fifth aspect of the first example system, the one or more processors are configured to obtain the publicly available data regarding the user from the one or more sources including at least one social media service. The fifth aspect of the first example system may be implemented in combination with the first, second, third, and/or fourth aspect of the first example system, though the example embodiments are not limited in this respect.

In a sixth aspect of the first example system, the one or more processors are configured to obtain the publicly available data regarding the user from the one or more sources including a company profile of the user. The sixth aspect of the first example system may be implemented in combination with the first, second, third, fourth, and/or fifth aspect of the first example system, though the example embodiments are not limited in this respect.

In a seventh aspect of the first example system, the one or more processors are configured to apply the password generation models using the publicly available data and further using one or more items of content that are trending online to generate the sample passwords. The seventh aspect of the first example system may be implemented in combination with the first, second, third, fourth, fifth, and/or sixth aspect of the first example system, though the example embodiments are not limited in this respect.

In an eighth aspect of the first example system, the one or more processors are configured to apply the password generation models using the publicly available data and further using information regarding one or more current events to generate the sample passwords. The eighth aspect of the first example system may be implemented in combination with the first, second, third, fourth, fifth, sixth, and/or seventh aspect of the first example system, though the example embodiments are not limited in this respect.

In a ninth aspect of the first example system, the one or more processors are configured to apply the password generation models using the publicly available data and further using information regarding a local environment of the user to generate the sample passwords. The ninth aspect of the first example system may be implemented in combination with the first, second, third, fourth, fifth, sixth, seventh, and/or eighth aspect of the first example system, though the example embodiments are not limited in this respect.

In a tenth aspect of the first example system, the user password is a hashed version of the user password. In accordance with the tenth aspect, the test includes comparing hashed versions of the sample passwords to the hashed version of the user password to programmatically determine that the user password and each of the one or more determined sample passwords include at least one common element. The tenth aspect of the first example system may be implemented in combination with the first, second, third, fourth, fifth, sixth, seventh, eighth, and/or ninth aspect of the first example system, though the example embodiments are not limited in this respect.

In an eleventh aspect of the first example system, the one or more processors are configured to collect anonymized data, which includes the user password, from the computing device. The eleventh aspect of the first example system may be implemented in combination with the first, second, third, fourth, fifth, sixth, seventh, eighth, ninth, and/or tenth aspect of the first example system, though the example embodiments are not limited in this respect.

In a twelfth aspect of the first example system, the one or more processors are configured to extract the password generation models from hashed versions of the passwords. The twelfth aspect of the first example system may be implemented in combination with the first, second, third, fourth, fifth, sixth, seventh, eighth, ninth, tenth, and/or eleventh aspect of the first example system, though the example embodiments are not limited in this respect.

A second example system to increase security of a designated password-protected resource comprises memory and one or more processors coupled to the memory. The one or more processors are configured to receive a user password to be utilized to access the designated password-protected resource from a user of a computing device. The one or more processors are further configured to receive sample passwords that result from application of publicly available data regarding the user to password generation models, which are extracted from passwords that are generated by users to access one or more password-protected resources. The one or more processors are further configured to increase the security of the designated password-protected resource (a) by testing the user password using the sample passwords, the testing including comparing the sample passwords to the user password to programmatically determine that the user password and each of one or more determined sample passwords, which are included among the sample passwords, include at least one common element, and (b) further by recommending an alternative password for use by the user in lieu of the user password based at least in part on a determination that the user password and each of the one or more determined sample passwords include at least one common element.

In a first aspect of the second example system, the password generation models are extracted from the passwords using a machine learning technique that identifies categories of data regarding the users in the passwords and that defines the password generation models based at least in part on respective combinations of at least some of the categories.

In a second aspect of the second example system, the password generation models are extracted from the passwords, which include at least one password generated by at least one user utilizing a password changing user interface. The second aspect of the second example system may be implemented in combination with the first aspect of the second example system, though the example embodiments are not limited in this respect.

In a third aspect of the second example system, at least one of the password generation models is extracted from the passwords utilizing a natural language processing technique. The third aspect of the second example system may be implemented in combination with the first and/or second aspect of the second example system, though the example embodiments are not limited in this respect.

In a fourth aspect of the second example system, the one or more determined sample passwords have one or more respective first estimated probabilities of being used by the user. In accordance with the fourth aspect, the alternative password has a second estimated probability of being used by the user that is less than each of the one or more first estimated probabilities. In further accordance with the fourth aspect, the one or more processors are configured to recommend the alternative password to be used by the user in lieu of the user password further based at least in part on the second estimated probability of the alternative password being less than each of the one or more first estimated probabilities of the one or more respective determined sample passwords. The fourth aspect of the second example system may be implemented in combination with the first, second, and/or third aspect of the second example system, though the example embodiments are not limited in this respect.

In a first implementation of the fourth aspect of the second example system, the one or more processors are configured to recommend the alternative password to be used by the user in lieu of the user password further based at least in part on the second estimated probability being less than a fixed threshold probability.

In a second implementation of the fourth aspect of the second example system, the first estimated probability of each of the one or more determined sample passwords is based at least in part on a number of the passwords that are generated by the users to access the one or more password-protected resources that correspond to the password generation model from which the determined sample password is generated.

In a fifth aspect of the second example system, at least a portion of the publicly available data regarding the user that are applied to the password generation models is obtained from at least one social media service. The fifth aspect of the second example system may be implemented in combination with the first, second, third, and/or fourth aspect of the second example system, though the example embodiments are not limited in this respect.

In a sixth aspect of the second example system, at least a portion of the publicly available data regarding the user that are applied to the password generation models is obtained from a company profile of the user. The sixth aspect of the second example system may be implemented in combination with the first, second, third, fourth, and/or fifth aspect of the second example system, though the example embodiments are not limited in this respect.

In a seventh aspect of the second example system, the sample passwords result from application of the publicly available data regarding the user and items of content that are trending online to the password generation models. The seventh aspect of the second example system may be implemented in combination with the first, second, third, fourth, fifth, and/or sixth aspect of the second example system, though the example embodiments are not limited in this respect.

In an eighth aspect of the second example system, the sample passwords result from application of the publicly available data regarding the user and information regarding one or more current events to the password generation models. The eighth aspect of the second example system may be implemented in combination with the first, second, third, fourth, fifth, sixth, and/or seventh aspect of the second example system, though the example embodiments are not limited in this respect.

In a ninth aspect of the second example system, the sample passwords result from application of the publicly available data regarding the user and information regarding a local environment of the user to the password generation models. The ninth aspect of the second example system may be implemented in combination with the first, second, third, fourth, fifth, sixth, seventh, and/or eighth aspect of the second example system, though the example embodiments are not limited in this respect.

In a first example method of increasing security of a designated password-protected resource, password generation models are extracted from passwords that are generated by users to access one or more password-protected resources. A user password is received to be utilized to access the designated password-protected resource from a user of a computing device. Publicly available data regarding the user is obtained from one or more sources. The security of the designated password-protected resource is increased (a) by applying the password generation models using the publicly available data to generate sample passwords, (b) further by causing a test to be performed on the user password using the sample passwords, the test including comparing the sample passwords to the user password to programmatically determine that the user password and each of one or more determined sample passwords, which are included among the sample passwords, include at least one common element, and (c) further by causing an alternative password to be recommended for use by the user in lieu of the user password based at least in part on a determination that the user password and each of the one or more determined sample passwords include at least one common element.

In a first aspect of the first example method, extracting the password generation models from the passwords comprises identifying categories of data regarding the users in the passwords, which are generated by the users to access the one or more password-protected resources, by analyzing the passwords using a machine learning technique. In accordance with the first aspect, extracting the password generation models from the passwords comprises defining the password generation models using the machine learning technique based at least in part on respective combinations of at least some of the categories. In further accordance with the first aspect, applying the password generation models comprises applying the publicly available data regarding the user to corresponding categories to generate the sample passwords.

In a second aspect of the first example method, extracting the password generation models comprises extracting the password generation models from the passwords that include at least one password generated by at least one user utilizing a password changing user interface. The second aspect of the first example method may be implemented in combination with the first aspect of the first example method, though the example embodiments are not limited in this respect.

In a third aspect of the first example method, extracting the password generation models comprises extracting the password generation models, utilizing a natural language processing technique, from the passwords that are generated by the users. The third aspect of the first example method may be implemented in combination with the first and/or second aspect of the first example method, though the example embodiments are not limited in this respect.

In a fourth aspect of the first example method, the one or more determined sample passwords have one or more respective first estimated probabilities of being used by the user. In accordance with the fourth aspect, the alternative password has a second estimated probability of being used by the user that is less than each of the one or more first estimated probabilities. In further accordance with the fourth aspect, causing the alternative password to be recommended comprises causing the alternative password to be recommended for use by the user in lieu of the user password further based at least in part on the second estimated probability of the alternative password being less than each of the one or more first estimated probabilities of the one or more respective determined sample passwords. The fourth aspect of the first example method may be implemented in combination with the first, second, and/or third aspect of the first example method, though the example embodiments are not limited in this respect.

In a first implementation of the fourth aspect of the first example method, causing the alternative password to be recommended comprises causing the alternative password to be recommended for use by the user in lieu of the user password further based at least in part on the second estimated probability being less than a fixed threshold probability.

In a second implementation of the fourth aspect of the first example method, the first estimated probability of each of the one or more determined sample passwords is based at least in part on a number of the passwords, which are generated by the users to access the one or more password-protected resources, that correspond to the password generation model from which the determined sample password is generated.

In a fifth aspect of the first example method, obtaining the publicly available data comprises obtaining the publicly available data regarding the user from the one or more sources including at least one social media service. The fifth aspect of the first example method may be implemented in combination with the first, second, third, and/or fourth aspect of the first example method, though the example embodiments are not limited in this respect.

In a sixth aspect of the first example method, obtaining the publicly available data comprises obtaining the publicly available data regarding the user from the one or more sources including a company profile of the user. The sixth aspect of the first example method may be implemented in combination with the first, second, third, fourth, and/or fifth aspect of the first example method, though the example embodiments are not limited in this respect.

In a seventh aspect of the first example method, applying the password generation models using the publicly available data to generate sample passwords comprises applying the password generation models using the publicly available data and further using one or more items of content that are trending online to generate the sample passwords. The seventh aspect of the first example method may be implemented in combination with the first, second, third, fourth, fifth, and/or sixth aspect of the first example method, though the example embodiments are not limited in this respect.

In an eighth aspect of the first example method, applying the password generation models using the publicly available data to generate sample passwords comprises applying the password generation models using the publicly available data and further using information regarding one or more current events to generate the sample passwords. The eighth aspect of the first example method may be implemented in combination with the first, second, third, fourth, fifth, sixth, and/or seventh aspect of the first example method, though the example embodiments are not limited in this respect.

In a ninth aspect of the first example method, applying the password generation models using the publicly available data to generate sample passwords comprises applying the password generation models using the publicly available data and further using information regarding a local environment of the user to generate the sample passwords. The ninth aspect of the first example method may be implemented in combination with the first, second, third, fourth, fifth, sixth, seventh, and/or eighth aspect of the first example method, though the example embodiments are not limited in this respect.

In a tenth aspect of the first example method, receiving the user password comprises receiving a hashed version of the user password. In accordance with the tenth aspect, the test includes comparing hashed versions of the sample passwords to the hashed version of the user password to programmatically determine that the user password and each of the one or more determined sample passwords include at least one common element. The tenth aspect of the first example method may be implemented in combination with the first, second, third, fourth, fifth, sixth, seventh, eighth, and/or ninth aspect of the first example method, though the example embodiments are not limited in this respect.

In an eleventh aspect of the first example method, receiving the user password comprises collecting anonymized data, which includes the user password, from the computing device. The eleventh aspect of the first example method may be implemented in combination with the first, second, third, fourth, fifth, sixth, seventh, eighth, ninth, and/or tenth aspect of the first example method, though the example embodiments are not limited in this respect.

In a twelfth aspect of the first example method, extracting the password generation models from the passwords comprises extracting the password generation models from hashed versions of the passwords. The twelfth aspect of the first example method may be implemented in combination with the first, second, third, fourth, fifth, sixth, seventh, eighth, ninth, tenth, and/or eleventh aspect of the first example method, though the example embodiments are not limited in this respect.

In a second example method of increasing security of a designated password-protected resource, a user password is received to be utilized to access the designated password-protected resource from a user of a computing device. Sample passwords are received that result from application of publicly available data regarding the user to password generation models, which are extracted from passwords that are generated by users to access one or more password-protected resources. The security of the designated password-protected resource is increased (a) by testing the user password using the sample passwords, the testing including comparing the sample passwords to the user password to programmatically determine that the user password and each of one or more determined sample passwords, which are included among the sample passwords, include at least one common element, and (b) further by recommending an alternative password for use by the user in lieu of the user password based at least in part on a determination that the user password and each of the one or more determined sample passwords include at least one common element.

In a first aspect of the second example method, receiving the sample passwords comprises receiving the sample passwords that result from application of the publicly available data regarding the user to the password generation models, which are extracted from the passwords using a machine learning technique that identifies categories of data regarding the users in the passwords and that defines the password generation models based at least in part on respective combinations of at least some of the categories.

In a second aspect of the second example method, the password generation models are extracted from the passwords, which include at least one password generated by at least one user utilizing a password changing user interface. The second aspect of the second example method may be implemented in combination with the first aspect of the second example method, though the example embodiments are not limited in this respect.

In a third aspect of the second example method, receiving the sample passwords comprises receiving the sample passwords that result from application of the publicly available data regarding the user to the password generation models, at least some of which are extracted from the passwords utilizing a natural language processing technique. The third aspect of the second example method may be implemented in combination with the first and/or second aspect of the second example method, though the example embodiments are not limited in this respect.

In a fourth aspect of the second example method, the one or more determined sample passwords have one or more respective first estimated probabilities of being used by the user. In accordance with the fourth aspect, the alternative password has a second estimated probability of being used by the user that is less than each of the one or more first estimated probabilities. In further accordance with the fourth aspect, recommending the alternative password comprises recommending the alternative password to be used by the user in lieu of the user password further based at least in part on the second estimated probability of the alternative password being less than each of the one or more first estimated probabilities of the one or more respective determined sample passwords. The fourth aspect of the second example method may be implemented in combination with the first, second, and/or third aspect of the second example method, though the example embodiments are not limited in this respect.

In a first implementation of the fourth aspect of the second example method, recommending the alternative password comprises recommending the alternative password to be used by the user in lieu of the user password further based at least in part on the second estimated probability being less than a fixed threshold probability.

In a second implementation of the fourth aspect of the second example method, the first estimated probability of each of the one or more determined sample passwords is based at least in part on a number of the passwords that are generated by the users to access the one or more password-protected resources that correspond to the password generation model from which the determined sample password is generated.

In a fifth aspect of the second example method, at least a portion of the publicly available data regarding the user that are applied to the password generation models is obtained from at least one social media service. The fifth aspect of the second example method may be implemented in combination with the first, second, third, and/or fourth aspect of the second example method, though the example embodiments are not limited in this respect.

In a sixth aspect of the second example method, at least a portion of the publicly available data regarding the user that are applied to the password generation models is obtained from a company profile of the user. The sixth aspect of the second example method may be implemented in combination with the first, second, third, fourth, and/or fifth aspect of the second example method, though the example embodiments are not limited in this respect.

In a seventh aspect of the second example method, receiving the sample passwords comprises receiving the sample passwords that result from application of the publicly available data regarding the user and items of content that are trending online to the password generation models. The seventh aspect of the second example method may be implemented in combination with the first, second, third, fourth, fifth, and/or sixth aspect of the second example method, though the example embodiments are not limited in this respect.

In an eighth aspect of the second example method, receiving the sample passwords comprises receiving the sample passwords that result from application of the publicly available data regarding the user and information regarding one or more current events to the password generation models. The eighth aspect of the second example method may be implemented in combination with the first, second, third, fourth, fifth, sixth, and/or seventh aspect of the second example method, though the example embodiments are not limited in this respect.

In a ninth aspect of the second example method, receiving the sample passwords comprises receiving the sample passwords that result from application of the publicly available data regarding the user and information regarding a local environment of the user to the password generation models. The ninth aspect of the second example method may be implemented in combination with the first, second, third, fourth, fifth, sixth, seventh, and/or eighth aspect of the second example method, though the example embodiments are not limited in this respect.

A first example computer program product comprises a computer-readable storage medium having instructions recorded thereon for enabling a processor-based system to increase security of a designated password-protected resource by performing operations. The operations comprise extract password generation models from passwords that are generated by users to access one or more password-protected resources. The operations further comprise receive a user password to be utilized to access the designated password-protected resource from a user of a computing device. The operations further comprise obtain publicly available data regarding the user from one or more sources. The operations further comprise increase the security of the designated password-protected resource (a) by applying the password generation models using the publicly available data to generate sample passwords, (b) further by causing a test to be performed on the user password using the sample passwords, the test including comparing the sample passwords to the user password to programmatically determine that the user password and each of one or more determined sample passwords, which are included among the sample passwords, include at least one common element, and (c) further by causing an alternative password to be recommended for use by the user in lieu of the user password based at least in part on a determination that the user password and each of the one or more determined sample passwords include at least one common element.

A second example computer program product comprises a computer-readable storage medium having instructions recorded thereon for enabling a processor-based system to increase security of a designated password-protected resource by performing operations. The operations comprise receive a user password to be utilized to access the designated password-protected resource from a user of a computing device. The operations further comprise receive sample passwords that result from application of publicly available data regarding the user to password generation models, which are extracted from passwords that are generated by users to access one or more password-protected resources. The operations further comprise increase the security of the designated password-protected resource (a) by testing the user password using the sample passwords, the testing including comparing the sample passwords to the user password to programmatically determine that the user password and each of one or more determined sample passwords, which are included among the sample passwords, include at least one common element, and (b) further by recommending an alternative password for use by the user in lieu of the user password based at least in part on a determination that the user password and each of the one or more determined sample passwords include at least one common element.

IV. Example Computer System

Figure 7:
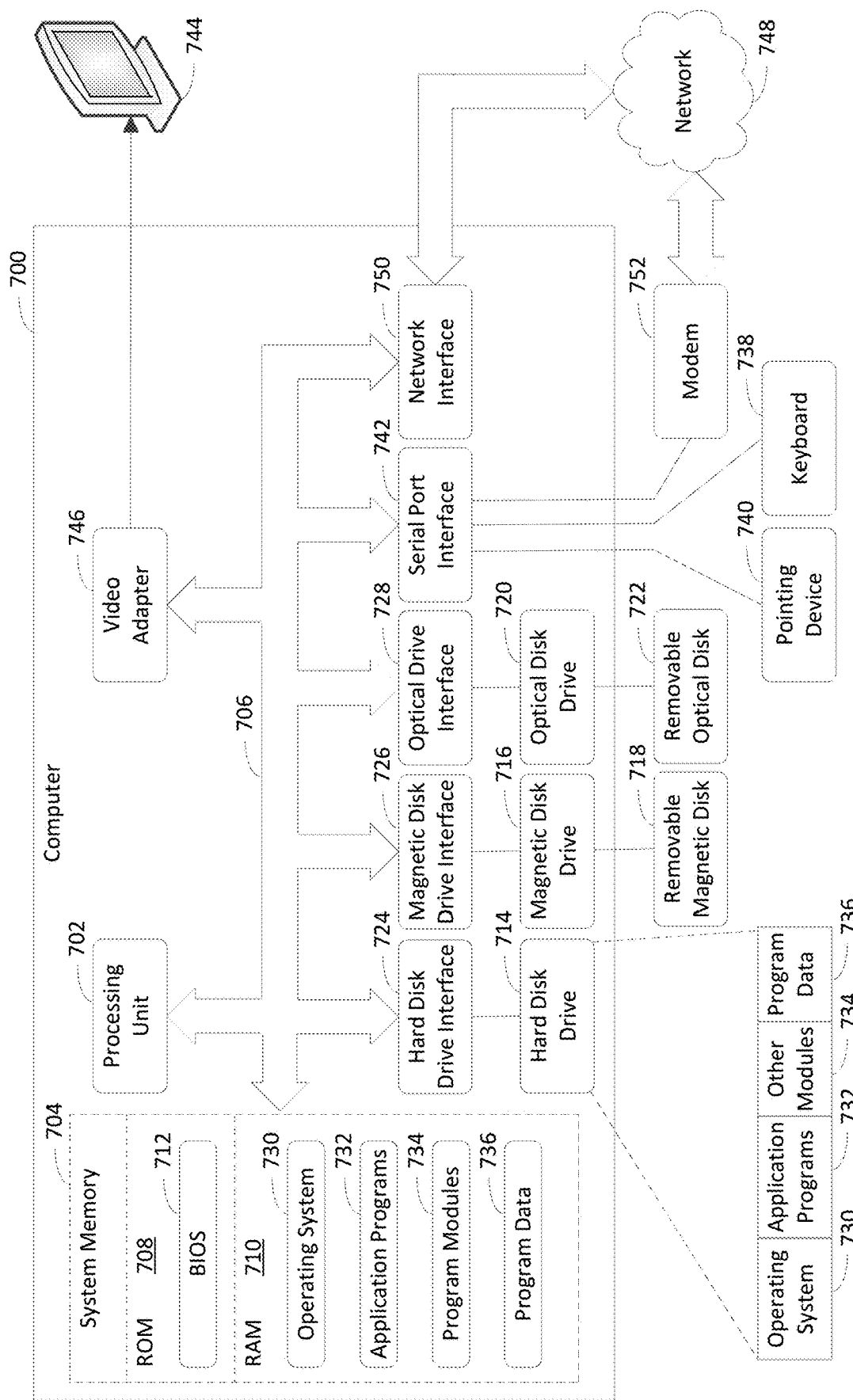
FIG. 7 depicts an example computer in which embodiments may be implemented.

FIG. 7 depicts an example computer 700 in which embodiments may be implemented. Any one or more of user devices 102A-102M and/or any one or more of servers 106A-106N shown in FIG. 1; any one or more of user devices 202 and/or source(s) 206 shown in FIG. 2; server(s) 400 shown in FIG. 4; and/or user device 600 shown in FIG. 6 may be implemented using computer 700, including one or more features of computer 700 and/or alternative features. Computer 700 may be a general-purpose computing device in the form of a conventional personal computer, a mobile computer, or a workstation, for example, or computer 700 may be a special purpose computing device. The description of computer 700 provided herein is provided for purposes of illustration, and is not intended to be limiting. Embodiments may be implemented in further types of computer systems, as would be known to persons skilled in the relevant art(s).

As shown in FIG. 7, computer 700 includes a processing unit 702, a system memory 704, and a bus 706 that couples various system components including system memory 704 to processing unit 702. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random access memory (RAM) 710. A basic input/output system 712 (BIOS) is stored in ROM 708.

Computer 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 730, one or more application programs 732, other program modules 734, and program data 736. Application programs 732 or program modules 734 may include, for example, computer program logic for implementing any one or more of (e.g., at least a portion of) client-side public data-based security logic 108, server-side public data-based security logic 110, client-side public data-based security logic 208, server-side public data-based security logic 210, server-side public data-based security logic 410, extraction logic 452, password generation logic 454, training logic 470, inference logic 472, client-side public data-based security logic 608, testing logic 676, password generation logic 674, activity diagram 200 (including any activity of activity diagram 200), flowchart 300 (including any step of flowchart 300), and/or flowchart 500 (including any step of flowchart 500), as described herein.

A user may enter commands and information into the computer 700 through input devices such as keyboard 738 and pointing device 740. Other input devices (not shown) may include a microphone, joystick, game pad, satellite dish, scanner, touch screen, camera, accelerometer, gyroscope, or the like. These and other input devices are often connected to the processing unit 702 through a serial port interface 742 that is coupled to bus 706, but may be connected by other interfaces, such as a parallel port, game port, or a universal serial bus (USB).

A display device 744 (e.g., a monitor) is also connected to bus 706 via an interface, such as a video adapter 746. In addition to display device 744, computer 700 may include other peripheral output devices (not shown) such as speakers and printers.

Computer 700 is connected to a network 748 (e.g., the Internet) through a network interface or adapter 750, a modem 752, or other means for establishing communications over the network. Modem 752, which may be internal or external, is connected to bus 706 via serial port interface 742.

As used herein, the terms "computer program medium" and "computer-readable storage medium" are used to generally refer to media (e.g., non-transitory media) such as the hard disk associated with hard disk drive 714, removable magnetic disk 718, removable optical disk 722, as well as other media such as flash memory cards, digital video disks, random access memories (RAMs), read only memories (ROM), and the like. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 732 and other program modules 734) may be stored on the hard disk, magnetic disk, optical disk, ROM, or RAM. Such computer programs may also be received via network interface 750 or serial port interface 742. Such computer programs, when executed or loaded by an application, enable computer 700 to implement features of embodiments discussed herein. Accordingly, such computer programs represent controllers of the computer 700.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system to increase security of a designated password-protected resource, the system comprising:
    a memory; and
    one or more processors coupled to the memory, the one or more processors configured to:
        extract password generation models from passwords that are generated by users to access one or more password-protected resources;
        receive a user password to be utilized to access the designated password-protected resource from a user of a computing device;
        obtain publicly available data regarding the user from one or more sources; and
        increase the security of the designated password-protected resource by
            (a) applying the publicly available data to the password generation models to generate sample passwords,
            (b) causing a test to be performed on the user password using the sample passwords, the test including comparing the sample passwords to the user password to programmatically determine that the user password and each of one or more determined sample passwords, which are included among the sample passwords, include at least one common element,
                wherein the one or more determined sample passwords have one or more respective first estimated probabilities of being used by the user,
                wherein an alternative password has a second estimated probability of being used by the user that is less than each of the one or more first estimated probabilities, and
            (c) causing the alternative password to be recommended for use by the user in lieu of the user password based at least in part on a determination that the user password and each of the one or more determined sample passwords include at least one common element and further based at least in part on the second estimated probability of the alternative password being less than each of the one or more first estimated probabilities of the one or more respective determined sample passwords and further based at least in part on the second estimated probability being less than a fixed threshold probability.

2. The system of claim 1, wherein the one or more processors are configured to:
    identify categories of data regarding the users in the passwords, which are generated by the users to access the one or more password-protected resources, by analyzing the passwords using a machine learning technique;
    define the password generation models using the machine learning technique based at least in part on respective combinations of at least some of the categories; and
    apply the publicly available data regarding the user to corresponding categories to generate the sample passwords.

3. The system of claim 1, wherein the one or more processors are configured to:
    extract the password generation models from the passwords that include at least one password generated by at least one user utilizing a password changing user interface.

4. The system of claim 1, wherein the one or more processors are configured to:
    extract the password generation models, utilizing a natural language processing technique, from the passwords that are generated by the users.

5. The system of claim 1, wherein the first estimated probability of each of the one or more determined sample passwords is based at least in part on how many of the passwords, which are generated by the users to access the one or more password-protected resources, correspond to the password generation model from which the determined sample password is generated.

6. The system of claim 1, wherein the one or more processors are configured to:
obtain the publicly available data regarding the user from the one or more sources including at least one of (a) one or more social media services or (b) a company profile of the user.

7. The system of claim 1, wherein the one or more processors are configured to:
apply the publicly available data and one or more items of content that are trending online to the password generation models to generate the sample passwords.

8. The system of claim 1, wherein the one or more processors are configured to:
apply the publicly available data and information regarding one or more current events to the password generation models to generate the sample passwords.

9. The system of claim 1, wherein the one or more processors are configured to:
apply the publicly available data and information regarding a local environment of the user to the password generation models to generate the sample passwords.

10. The system of claim 1, wherein the user password is a hashed version of the user password; and
wherein the test includes comparing hashed versions of the sample passwords to the hashed version of the user password to programmatically determine that the user password and each of the one or more determined sample passwords include at least one common element.

11. The system of claim 1, the one or more processors are configured to:
collect anonymized data, which includes the user password, from the computing device.

12. The system of claim 1, wherein the one or more processors are configured to:
extract the password generation models from hashed versions of the passwords.

13. A system to increase security of a designated password-protected resource, the system comprising:
a memory; and
one or more processors coupled to the memory, the one or more processors configured to:
receive a user password to be utilized to access the designated password-protected resource from a user of a computing device;
receive sample passwords that result from application of publicly available data regarding the user to password generation models, which are extracted from passwords that are generated by users to access one or more password-protected resources; and
increase the security of the designated password-protected resource by
(a) testing the user password using the sample passwords, the testing including comparing the sample passwords to the user password to programmatically determine that the user password and each of one or more determined sample passwords, which are included among the sample passwords, include at least one common element,
wherein the one or more determined sample passwords have one or more respective first estimated probabilities of being used by the user,
wherein the first estimated probability of each of the one or more determined sample passwords is based at least in part on how many of the passwords that are generated by the users to access the one or more password-protected resources correspond to the password generation model from which the determined sample password is generated,
wherein an alternative password has a second estimated probability of being used by the user that is less than each of the one or more first estimated probabilities, and
(b) recommending the alternative password for use by the user in lieu of the user password based at least in part on a determination that the user password and each of the one or more determined sample passwords include at least one common element and further based at least in part on the second estimated probability of the alternative password being less than each of the one or more first estimated probabilities of the one or more respective determined sample passwords.

14. The system of claim 13, wherein the password generation models are extracted from the passwords using a machine learning technique that identifies categories of data regarding the users in the passwords and that defines the password generation models based at least in part on respective combinations of at least some of the categories.

15. The system of claim 13, wherein the one or more processors are configured to:
recommend the alternative password to be used by the user in lieu of the user password further based at least in part on the second estimated probability being less than a fixed threshold probability.

16. A method of increasing security of a designated password-protected resource, the method comprising:
extracting password generation models from passwords that are generated by users to access one or more password-protected resources;
receiving a user password to be utilized to access the designated password-protected resource from a user of a computing device;
obtaining publicly available data regarding the user from one or more sources; and
increasing the security of the designated password-protected resource by
(a) applying the publicly available data to the password generation models to generate sample passwords,
(b) causing a test to be performed on the user password using the sample passwords, the test including comparing the sample passwords to the user password to programmatically determine that the user password and each of one or more determined sample passwords, which are included among the sample passwords, include at least one common element,
wherein the one or more determined sample passwords have one or more respective first estimated probabilities of being used by the user,
wherein the first estimated probability of each of the one or more determined sample passwords is based at least in part on how many of the passwords, which are generated by the users to access the one or more password-protected resources, correspond to the password generation model from which the determined sample password is generated,
wherein an alternative password has a second estimated probability of being used by the user that is less than each of the one or more first estimated probabilities, and (c) causing the alternative password to be recommended for use by the user in lieu of the user password based at least in part on a determination that the user password and each of the one or more determined sample passwords include at least one common element and further based at least in part on the second estimated probability of the alternative password being less than each of the one or more first estimated probabilities of the one or more respective determined sample passwords.

17. The system of claim 1, wherein the one or more processors are configured to:
extract the password generation models from the passwords that are generated by the users to access the one or more password-protected resources such that at least a first password generation model of the password generation models is defined based on a derived relationship between portions of multiple passwords.

18. The system of claim 13, wherein the one or more processors are configured to:
extract the password generation models, utilizing a natural language processing technique, from the passwords that are generated by the users.

19. The method of claim 16, wherein extracting the password generation models comprises:
extracting the password generation models from encrypted versions of the passwords that are generated by the users to access the one or more password-protected resources.

20. The method of claim 16, wherein causing the alternative password to be recommended comprises:
causing the alternative password to be recommended for use by the user in lieu of the user password further based at least in part on the second estimated probability being less than a fixed threshold probability.

* * * * *